US012564783B2

(12) United States Patent
Ohashi et al.

(10) Patent No.: US 12,564,783 B2
(45) Date of Patent: Mar. 3, 2026

(54) INFORMATION PROCESSING APPARATUS, INFORMATION PROCESSING APPARATUS CONTROL METHOD, AND PROGRAM

(71) Applicants:Sony Interactive Entertainment Inc., Tokyo (JP); Sony Group Corporation, Tokyo (JP)

(72) Inventors: Yoshinori Ohashi, Tokyo (JP); Keita Mochizuki, Tokyo (JP); Yasutaka Fukumoto, Tokyo (JP)

(73) Assignees: Sony Group Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 623 days.

(21) Appl. No.: 17/768,278

(22) PCT Filed: Oct. 16, 2019

(86) PCT No.: PCT/JP2019/040753
§ 371 (c)(1),
(2) Date: Apr. 12, 2022

(87) PCT Pub. No.: WO2021/075004
PCT Pub. Date: Apr. 22, 2021

(65) Prior Publication Data
US 2022/0409991 A1 Dec. 29, 2022

(51) Int. Cl.
*G06K 9/00* (2022.01)
*A63F 13/211* (2014.01)
(Continued)

(52) U.S. Cl.
CPC .......... *A63F 13/212* (2014.09); *A63F 13/211* (2014.09); *G06T 7/20* (2013.01); *G06T 7/70* (2017.01)

(58) Field of Classification Search
CPC ...................................................... G01P 15/18
See application file for complete search history.

(56) References Cited

U.S. PATENT DOCUMENTS 8,983,124 B2 3/2015 Kourogi
9,939,456 B2 4/2018 Nagasaka
(Continued)

FOREIGN PATENT DOCUMENTS

JP 2015058167 A 3/2015
JP 2016001875 A 1/2016
(Continued)

OTHER PUBLICATIONS

International search report for corresponding PCT Application No. PCT/JP2019/040753, 4 pages, Nov. 26, 2019.
(Continued)

*Primary Examiner* — Hadi Akhavannik
(74) *Attorney, Agent, or Firm* — Kilpatrick Townsend & Stockton LLP

(57) ABSTRACT

Methods and apparatus provide for acquiring, from a plurality of sensors attached to a plurality of body parts of a target person, at least information regarding movement acceleration and posture angular velocity of each of body parts to which the sensors are attached, and estimating, on the basis of the acquired information regarding the movement acceleration and posture angular velocity, the movement velocity in a predetermined coordinate system of each of the body parts to which the sensors are attached. Subsequently, on the basis of the information regarding the estimated movement velocity of each of the body parts, the methods and apparatus provide for estimating the positions of predetermined body parts of the target person.

20 Claims, 6 Drawing Sheets

(51) Int. Cl.

| | | |
|---|---|---|
| *A63F 13/212* | (2014.01) | |
| *G06T 7/20* | (2017.01) | |
| *G06T 7/70* | (2017.01) | |

(56) References Cited

U.S. PATENT DOCUMENTS

| 12,150,756 B2 * | 11/2024 | Fukushi | A61B 5/1121 |
|---|---|---|---|
| 2008/0285805 A1 * | 11/2008 | Luinge | G06F 3/011 |
| | | | 382/128 |
| 2009/0171503 A1 * | 7/2009 | Takenaka | B62D 57/032 |
| | | | 700/250 |
| 2012/0237086 A1 | 9/2012 | Kourogi | |
| 2015/0081245 A1 | 3/2015 | Nagasaka | |
| 2015/0374307 A1 | 12/2015 | Nagasaka | |
| 2016/0129591 A1 * | 5/2016 | Kanemoto | B25J 9/1635 |
| | | | 700/254 |
| 2016/0166880 A1 * | 6/2016 | Nakajima | G06Q 10/0639 |
| | | | 434/247 |
| 2016/0273921 A1 * | 9/2016 | Zhou | G01C 21/1656 |
| 2016/0339293 A1 | 11/2016 | Perkins | |
| 2018/0096259 A1 * | 4/2018 | Andrews | G06V 10/82 |
| 2019/0056422 A1 * | 2/2019 | Park | G01P 13/00 |

| 2020/0393490 A1 * | 12/2020 | Aoki | G01P 15/18 |
|---|---|---|---|
| 2021/0141443 A1 * | 5/2021 | Fukumoto | A61B 5/1126 |
| 2021/0295580 A1 | 9/2021 | Ohashi | |
| 2021/0350551 A1 | 11/2021 | Ohashi | |

FOREIGN PATENT DOCUMENTS

| JP | 2016010562 A | 1/2016 |
|---|---|---|
| WO | 2020049692 A2 | 3/2020 |
| WO | 2020070812 A1 | 4/2020 |

OTHER PUBLICATIONS

S. Madgwick, "An efficient orientation filter for inertial and inertial/magnetic sensor arrays", (https://www.samba.org/fridge/UAV/madgwick_internal_report.pdf), 32 pages, Apr. 30, 2010.

Katsu Yamane, et al., "Pin-and-Drag Synergetic Interface for Choreography of Human Figures," Journal of the Robotics Society of Japan, vol. 20, No. 3, p. 335-343 (Apr. 2002)—English Abstract provided.

Decision to Grant a Patent for corresponding JP Application No. 2021-552042, 4 pages, Jan. 4, 2023.

* cited by examiner

F I G . 4
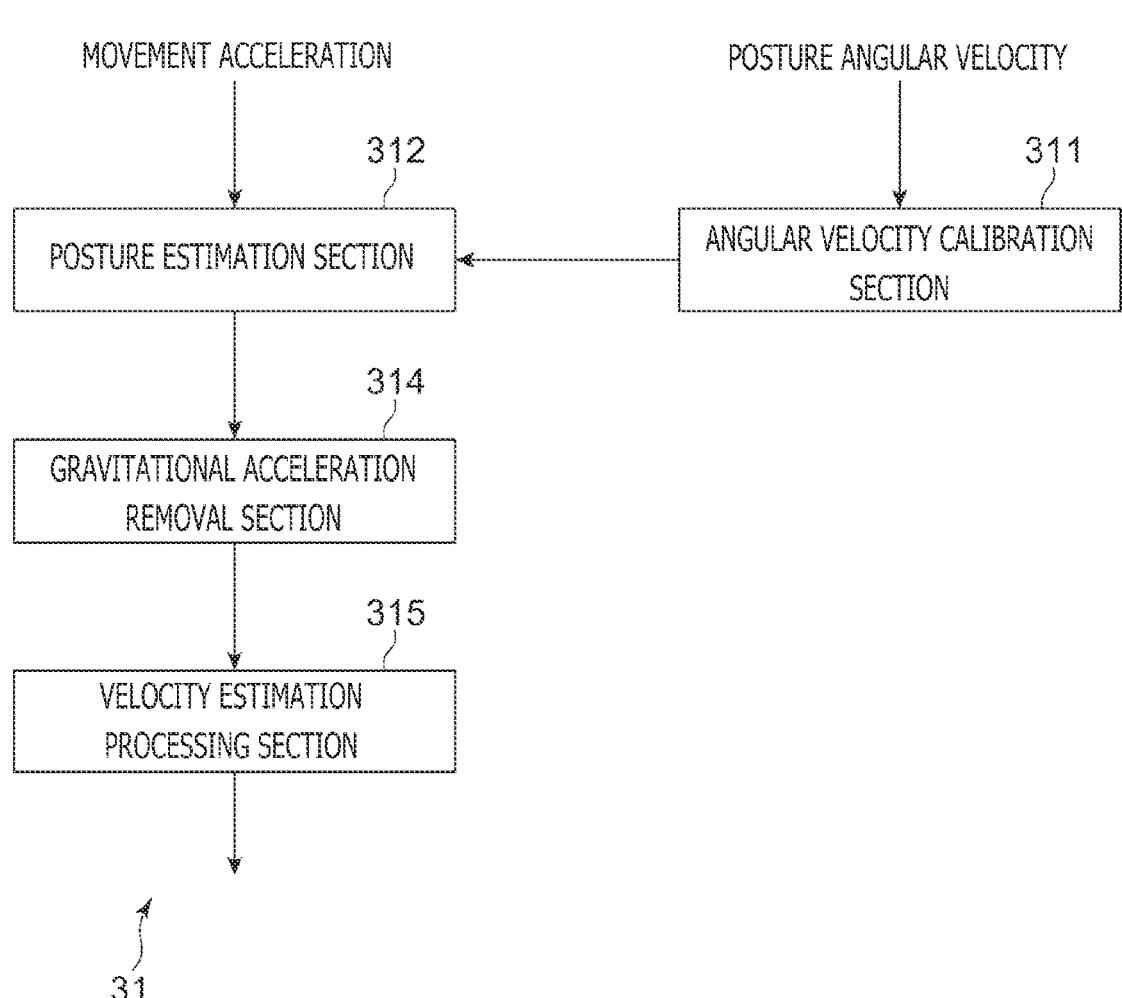

F I G . 6
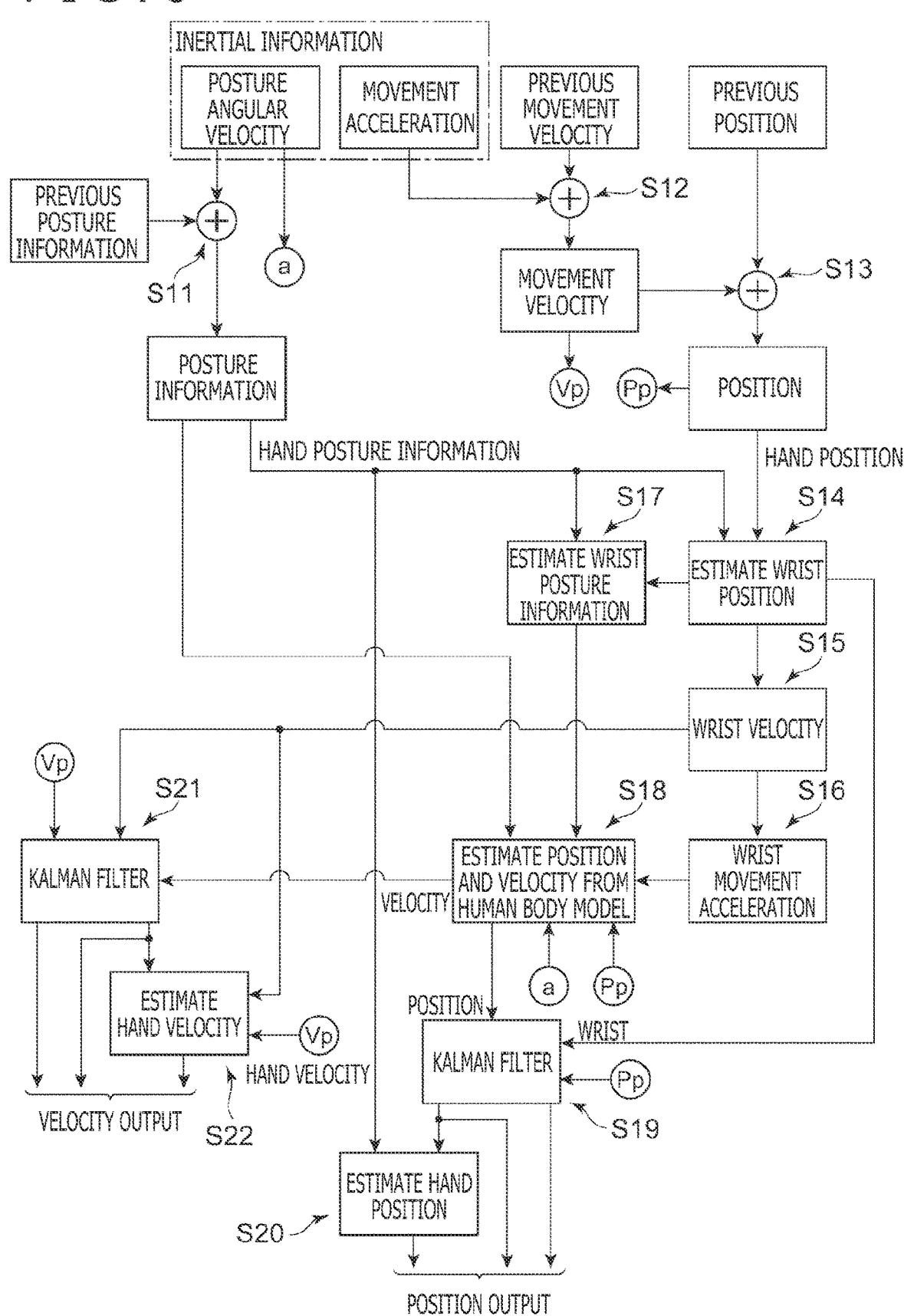

INFORMATION PROCESSING APPARATUS, INFORMATION PROCESSING APPARATUS CONTROL METHOD, AND PROGRAM

TECHNICAL FIELD

The present invention relates to an information processing apparatus, an information processing apparatus control method, and a program.

BACKGROUND ART

There is a known process for estimating information regarding a posture of a target person in a three-dimensional space by using an inverse kinematics method based on information that indicates positions in the three-dimensional space of markers or other similar devices attached to the head, hands, waist, and ankles of the target person and is acquired, for example, by capturing images through the use of a plurality of cameras.

SUMMARY

Technical Problems

However, the above-described conventional inverse kinematics method based on the positions of markers makes it necessary to attach the markers to the above-mentioned body parts of the target person and acquire information regarding the positions of the body parts of the target person. Yet, it is time consuming to attach the markers to the target person. Thus, it is preferable that the number of markers be minimized wherever possible. Further, all the positions of the markers attached to the body parts of the target person are not always imaged and detected depending on the posture of the target person.

A method employed to address the above problems is to attach the markers and IMU (Inertial Measurement Unit) sensors to the target person. In a case where the positions of the markers are not detected, this method makes it possible to estimate the information regarding the positions of the markers by using the results of detection by the IMU sensors. However, the output generated by the IMU sensors includes noise, and an integral operation needs to be performed twice in order to acquire the information indicative of the positions. Thus, errors induced by the noise accumulate. Consequently, when only the results of detection by the IMU sensors are used, a significant position estimation error occurs during a time interval of as short as several seconds. Therefore, the results of detection by the IMU sensors should not be used on an "as is" basis.

The present invention has been made in view of the above circumstances. An object of the present invention is to provide an information processing apparatus, an information processing apparatus control method, and a program that can estimate the posture of a target person on the basis of, for example, IMU sensor output generated with a minimum of error even in a case where a relatively small number of devices are used and the positions of the devices cannot be directly detected.

Solution to Problems

In order to solve the above conventional problems, according to an aspect of the present invention, there is provided an information processing apparatus including acquisition means, velocity estimation means, and position estimation means. The information processing apparatus is connected to a plurality of sensors that are attached to a plurality of body parts of a target person and configured to detect at least information regarding movement acceleration and posture angular velocity of the body parts of the target person. The acquisition means acquires, from the plurality of sensors, at least the information regarding the movement acceleration and posture angular velocity of the body parts to which the sensors are attached. The velocity estimation means estimates, on the basis of the acquired information regarding the movement acceleration and posture angular velocity, a movement velocity in a predetermined coordinate system of each of the body parts to which the sensors are attached. The position estimation means estimates, on the basis of the information regarding the estimated movement velocity of the body parts of the target person, the positions of the body parts of the target person that are determined in advance as the body parts required for estimating the posture of the target person according to inverse kinematics. The information processing apparatus subjects the information regarding the estimated positions of the body parts to predetermined processing.

Advantageous Effects of Invention

Consequently, the posture of the target person is estimated even in a case where a relatively small number of devices, such as the devices attached to at least the head and one hand of the target person, are used and the positions of the devices cannot be directly detected.

BRIEF DESCRIPTION OF DRAWINGS

FIG. 4 is another functional block diagram illustrating an example of processing performed by the information processing apparatus according to the embodiment of the present invention.

FIG. 6 is an explanatory diagram illustrating an example of some operations performed by the information processing apparatus according to the embodiment of the present invention.

DESCRIPTION OF EMBODIMENT

Figure 1:
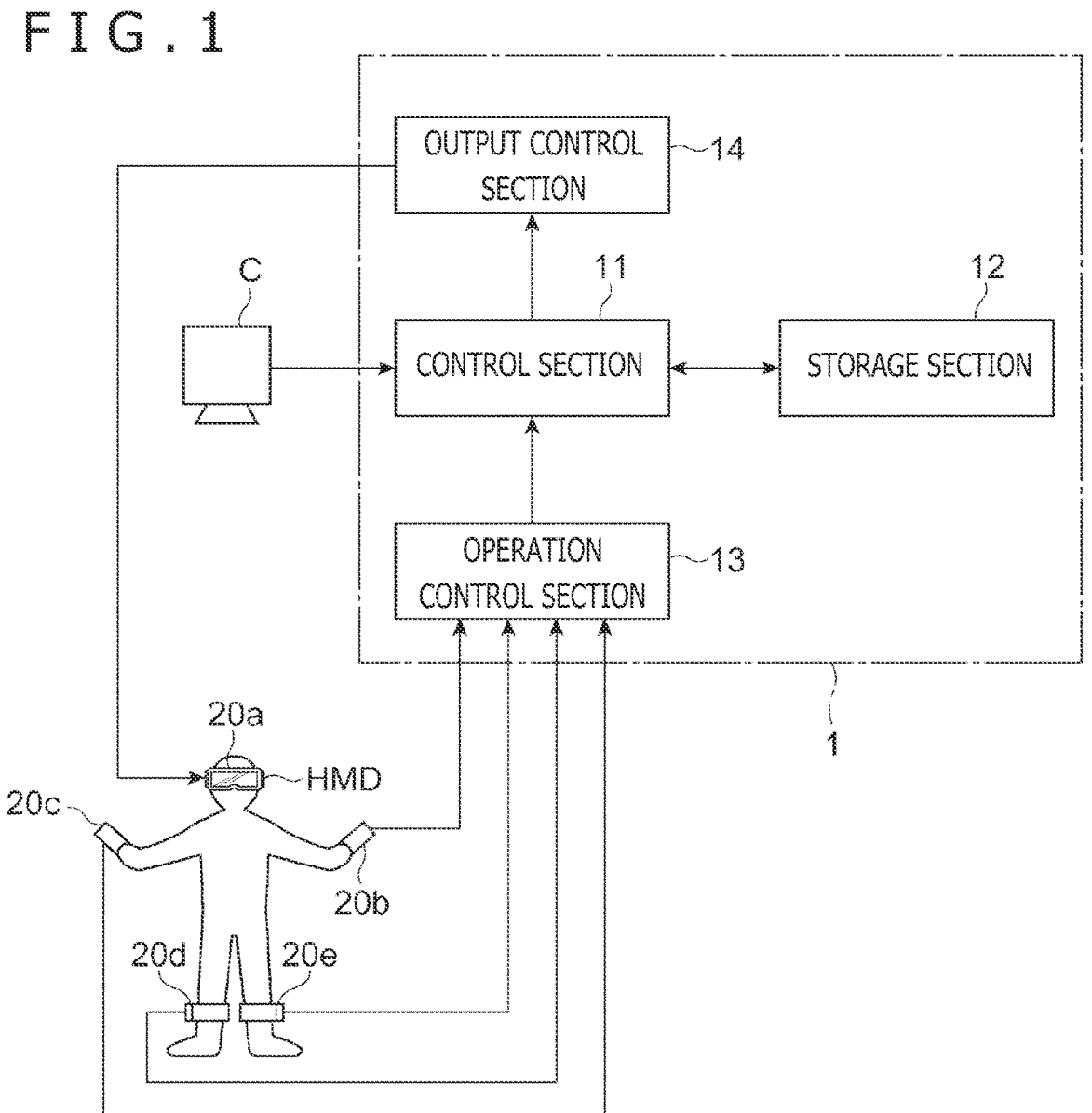
FIG. 1 is a block diagram illustrating a configuration and an example of connection of an information processing apparatus according to an embodiment of the present invention.

An embodiment of the present invention will now be described with reference to the accompanying drawings. As illustrated in FIG. 1, an information processing apparatus 1 according to an example of the embodiment of the present invention basically includes a control section 11, a storage section 12, an operation control section 13, and an output control section 14. The information processing apparatus 1 is connected in a wired or wireless manner to a plurality of sensor devices 20a, 20b, and so on that are attached to various body parts of a target person, such that communication is available between them.

Figure 2:
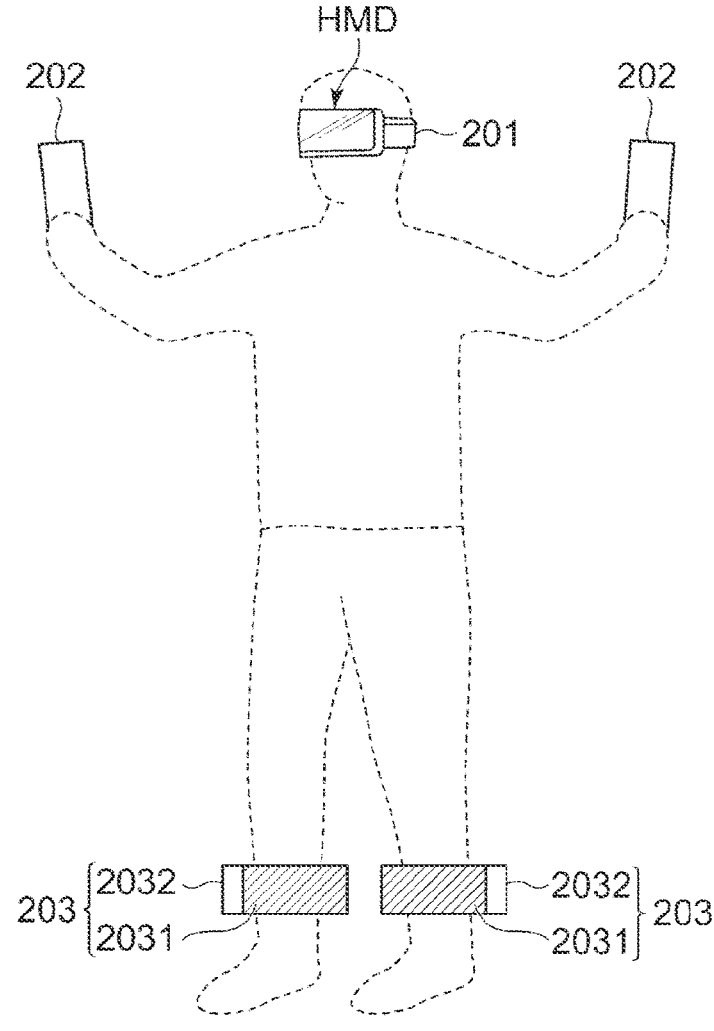
FIG. 2 is an explanatory diagram illustrating an example of attached sensor devices to be connected to the information processing apparatus according to the embodiment of the present invention.

Here, as illustrated in FIG. 2, the sensor devices 20 include a head sensor device 201, controller devices 202, and foot sensor devices 203. The controller devices 202 are respectively gripped by the left and right hands of the target person. The foot sensor devices 203 are attached to the left and right ankles of the target person.

The head sensor device 201 includes, for example, a head-mounted display HMD and a camera C. The head-mounted display HMD is mounted on the head of the target person. The camera C captures an image of the target person. The camera C is, for example, a stereo camera that is capable of acquiring information regarding the distance between the camera C and an imaged target object.

The head-mounted display HMD includes markers, such as light emitting diodes (LEDs), in addition to a display that displays images inputted from the output control section 14 of the information processing apparatus 1. The information processing apparatus 1 detects the markers on the head-mounted display HMD that is mounted on the head of the target person from an image captured by the camera C, and acquires posture information such as the information regarding the position and orientation of the head-mounted display HMD (and thus, the information regarding the position and orientation of the head of the target person wearing the head-mounted display HMD).

The controller devices 202 are substantially shaped like a column and gripped by the hands of the target person. As is the case with the head-mounted display HMD, the controller devices 202 are provided with markers such as LEDs. The markers are attached to the housings of the controller devices 202. The information processing apparatus 1 may detect the markers on the controller devices 202 that are gripped by the hands of the target person from an image captured by the camera C, and acquire posture information such as the information regarding the positions and orientations of the controller devices 202 (and thus, the information regarding the positions and orientations of the hands of the target person gripping the controller devices 202).

Note that, in the present embodiment, the controller devices 202 and the head sensor device 201 provided with the head-mounted display HMD further include therein an IMU sensor (inertial measurement sensor) that measures the movement acceleration in the directions of three axes orthogonal to each other and the angular velocity around the three axes. The IMU sensor (inertial measurement sensor) outputs, in a wired or wireless manner and to the information processing apparatus 1, inertial information including the information regarding the measured movement acceleration in the directions of the three axes and the information regarding the measured angular velocity (posture angular velocity) around the three axes.

Further, here, the foot sensor devices 203 each include, in the example of FIG. 2, a belt 2031 and a main body device 2032. The belt 2031 can be wound around an ankle of the target person and fastened. The main body device 2032 is secured to the belt 2031.

The main body device 2032 includes therein an IMU sensor (inertial measurement sensor) that measures the movement acceleration in the directions of three axes orthogonal to each other and the angular velocity around the three axes. The IMU sensor (inertial measurement sensor) outputs, in a wired or wireless manner and to the information processing apparatus 1, inertial information including the information regarding the measured movement acceleration in the directions of the three axes and the information regarding the measured angular velocity (posture angular velocity) around the three axes.

Note that the main body device 2032 may also be provided with markers such as LEDs. When the information processing apparatus 1 successfully detects the markers on the foot sensor devices 203 that are attached to the feet of the target person from an image captured by the camera C, the information processing apparatus 1 may acquire such posture information as the information regarding the positions and orientations of the foot sensor devices 203 (and thus, the information regarding the positions and orientations of the feet of the target person wearing the foot sensor devices 203). The image captured by the camera C need not always include an image of the ankles of the target person.

Stated differently, the present embodiment is capable of directly acquiring the information regarding the positions and postures of the sensor devices 20 on the basis of image data captured, for example, by the camera C. Further, in a case where the image data is not captured by the camera C (the sensor devices 20 are outside the angle of view of the camera C), the present embodiment is capable of obtaining the inertial information derived from the internal inertial measurement sensors and indirectly acquiring the information regarding the positions and postures of the sensor devices 20 on the basis of the obtained inertial information.

The control section 11 is a central processing unit (CPU) or other program control devices that operate in accordance with a program stored in the storage section 12. For example, as the processing of a game application, the control section 11 performs a game application process on the basis of, for example, operations of the controller devices 202 and the posture information regarding the target person. Further, as the processing of the game application, the control section 11 generates information regarding a game screen and instructs the output control section 14 to display the game screen on, for example, the head-mounted display HMD.

Further, in order to acquire the posture information regarding the target person, the control section 11 in the present embodiment acquires, from the sensor devices 20 attached to the plurality of body parts of the target person to detect at least the information regarding the movement acceleration and posture angular velocity of the body parts, at least the information regarding the movement acceleration of the body parts of the target person to which the sensor devices 20 are attached.

As previously described as an example, the sensor devices 20, namely, the head sensor device 201 (or more specifically, the head-mounted display HMD included in the head sensor device 201), the controller devices 202, and the foot sensor devices 203 (or more specifically, the main body devices 2032 included in the foot sensor devices 203), each include therein the IMU sensor (inertial measurement sensor), which measures the acceleration in the directions of three axes orthogonal to each other and the posture angular velocity around the three axes. Thus, it is assumed that the control section 11 of the information processing apparatus 1 acquires the information regarding the movement acceleration and posture angular velocity measured by the IMU sensor.

In the above instance, the information regarding the movement acceleration is acquired in a coordinate system specific to each of the sensor devices 20. For example, the controller devices 202 acquire the information regarding the movement acceleration in a coordinate system where the Z-axis represents the longitudinal direction of the housing gripped by the target person from a direction in which an internal acceleration sensor is positioned, the Y-axis represents the front-rear direction of the housing in a plane orthogonal to the Z-axis (e.g., the front-rear axis is determined from a position where a button for operation is disposed), and the X-axis represents a direction orthogonal to the Z- and Y-axes.

Meanwhile, the information regarding the posture angular velocity is outputted from each of the sensor devices 20 as the information regarding the angular velocity around the X-, Y-, and Z-axes.

The control section 11 estimates, on the basis of the acquired information regarding the movement acceleration, the movement velocity of the body parts of the target person to which the sensor devices 20 are attached, and then estimates, on the basis of the information regarding the estimated movement velocity of the body parts, the positions of the body parts of the target person that are determined in advance as the body parts required for estimating the posture information regarding the target person according to inverse kinematics.

Subsequently, the control section 11 uses the information regarding the estimated position and movement velocity of each of the body parts of the target person, for example, for a process of estimating the posture of the target person. The operations of the control section 11 will be described in detail later.

The storage section 12 is, for example, a memory device, and is adapted to store the program to be executed by the control section 11. The program may be supplied on a computer-readable non-transitory storage medium and stored in the storage section 12. Further, the storage section 12 also operates as a work memory of the control section 11.

The operation control section 13 receives the contents of an operation performed by the target person holding the controller devices 202, on the basis of information received from the controller devices 202 (and the camera C), and outputs information indicative of the contents of the operation to the control section 11.

The output control section 14 outputs, to the head-mounted display HMD or other display devices, information regarding images to be displayed in accordance with an instruction inputted from the control section 11.

Figure 3:
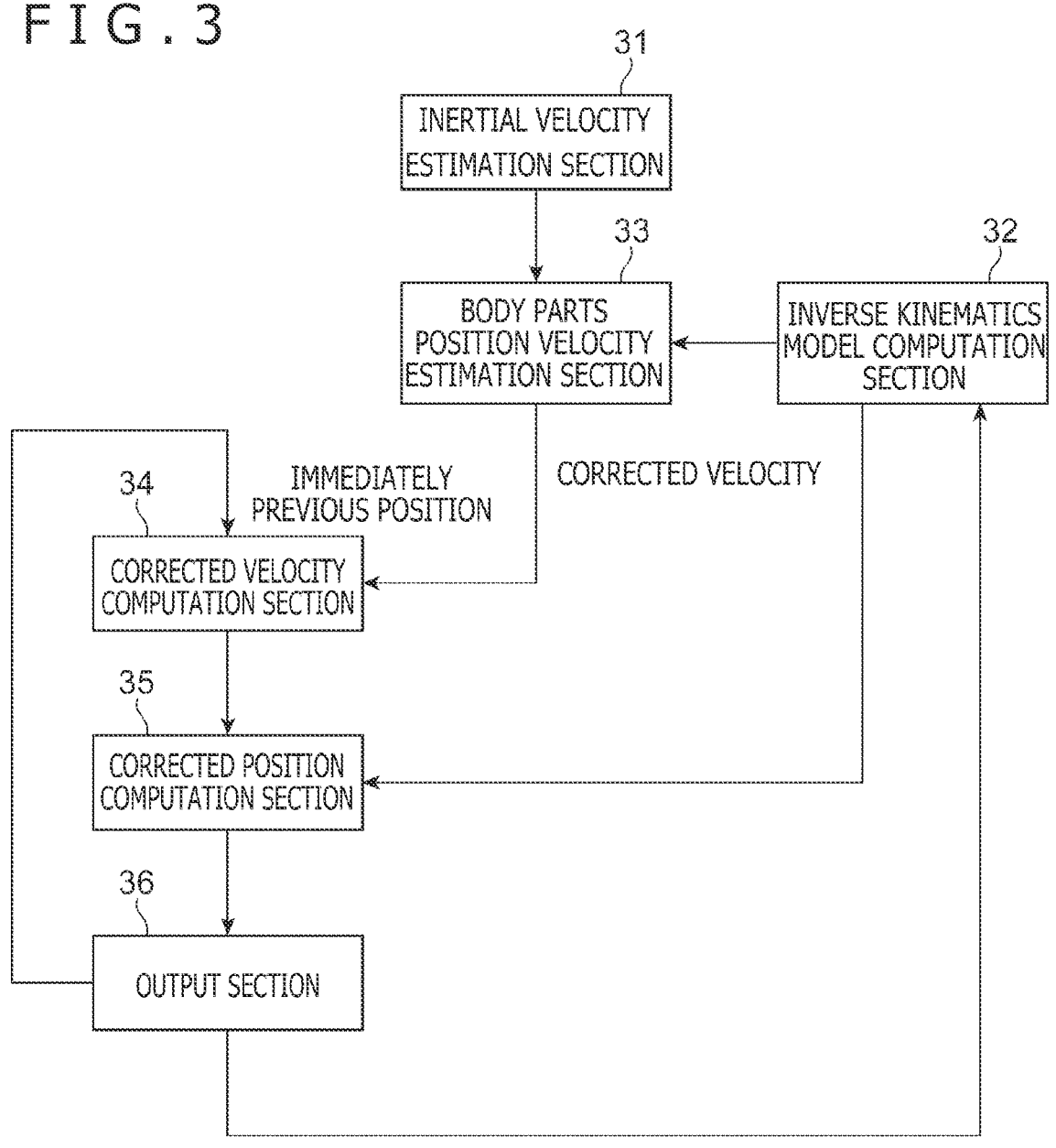
FIG. 3 is a functional block diagram illustrating an example of processing performed by the information processing apparatus according to the embodiment of the present invention.

[Target Person Posture Detection] A process performed by the control section 11 to detect the posture of the target person will now be described. In an example of the present embodiment, the control section 11 performing this process functionally includes, as illustrated in FIG. 3, an inertial velocity estimation section 31, an inverse kinematics model computation section 32, a body parts position velocity estimation section 33, a corrected velocity computation section 34, a corrected position computation section 35, and an output section 36.

The inertial velocity estimation section 31 receives the information regarding the movement acceleration and posture angular velocity that is outputted from each of the sensor devices 20, repetitively at predetermined timing intervals (e.g., repetitively at intervals of time Δt). Then, on the basis of the information regarding the movement acceleration and posture angular velocity of the body parts to which the sensor devices 20 are attached that is estimated on the basis of the received information regarding the movement acceleration and posture angular velocity, the inertial velocity estimation section 31 acquires, for example, information regarding the movement velocity of each of the body parts to which the sensor devices 20 are attached.

In a certain example of the present embodiment, as illustrated in FIG. 4, the inertial velocity estimation section 31 further functionally includes an angular velocity calibration section 311, a posture estimation section 312, a gravitational acceleration removal section 314, and a velocity estimation processing section 315.

Here, the angular velocity calibration section 311 receives the information regarding the movement acceleration and posture angular velocity that is outputted from the sensor devices 20, and displays a screen for instructing the target person to temporarily stand still, at a predetermined time point (e.g., at a time when initial information is received). Subsequently, when the angular velocity calibration section 311 determines that the target person is standing still (e.g., when a temporal change in the movement acceleration is smaller than a predetermined threshold value), the angular velocity calibration section 311 acquires the information regarding the current posture angular velocity a number of times, calculates an angular velocity bias by averaging the acquired pieces of information regarding the current posture angular velocity (on an individual component basis), and stores the calculated angular velocity bias in, for example, the storage section 12. Then, the angular velocity calibration section 311 presents, to the target person, a screen indicating the end of measurement.

Further, after acquiring the angular velocity bias, the angular velocity calibration section 311 receives the information regarding the movement acceleration and posture angular velocity that is outputted from the sensor devices 20, calibrates the posture angular velocity by subtracting, from the values of individual components of the posture angular velocity, the values of corresponding angular velocity bias components, and outputs the information regarding the calibrated posture angular velocity.

It should be noted that the above operation of the angular velocity calibration section 311 is illustrative and not restrictive. An alternative method may be adopted as far as it is possible to perform a process of subtracting the posture angular velocity bias from the value of the posture angular velocity.

The posture estimation section 312 estimates the posture information regarding the body parts to which the sensor devices 20 are attached and the direction of gravity at the positions of the body parts on the basis of the information regarding the calibrated posture angular velocity that is outputted from the angular velocity calibration section 311 and the information regarding the movement acceleration that is outputted from the sensor devices 20. Subsequently, the posture estimation section 312 converts the information regarding the posture angular velocity (the information expressed in a coordinate system specific to each of the sensor devices) that is outputted from the sensor devices 20, to information regarding posture angular velocity around three axes in a global coordinate system where a floor surface on which the target person is standing serves as a reference and that is configured such that the Y-axis represents the front-rear direction (e.g., the forward direction is assumed to be the positive direction) parallel to the floor surface and prevails when the target person is in an initial posture, that the X-axis represents the left-right direction (the leftward direction as viewed from the target person is assumed to be the positive direction), and further that the Z-axis represents a direction perpendicular to the floor surface. Then, the posture estimation section 312 outputs the result of conversion.

Further, in addition to the information regarding the movement acceleration that is outputted from the sensor devices 20, the posture estimation section 312 outputs the information regarding the posture angular velocity that is converted to the information in the above-mentioned global coordinate system and the posture information regarding the body parts to which the sensor devices 20 are attached (a posture quaternion based on the rotation around the axes of the global coordinate system).

A process to be executed in this instance by the posture estimation section 312 to estimate the posture information and the direction of gravity may be performed by using a widely known Madgwick filter (S. Madgwick, An efficient orientation filter for inertial and inertial/magnetic sensor arrays, Apr. 30, 2010 (https://www.samba.org/tridge/UAV/madgwick_internal_report.pdf)), and will thus not be described in detail here.

The gravitational acceleration removal section 314 receives input of information regarding the movement acceleration that is outputted from the sensor devices 20 and input of the posture information regarding the body parts to which the sensor devices 20 are attached (the information acquired from the posture estimation section 312), makes corrections by subtracting, from the information regarding the movement acceleration, the value of a corresponding acceleration offset, uses the corresponding posture information to acquire the information in the above-mentioned global coordinate system regarding the movement acceleration of the body parts to which the sensor devices 20 are attached, and outputs the acquired information.

The velocity estimation processing section 315 computes the information in the global coordinate system regarding the movement velocity of body parts to which the sensor devices 20 are attached, by using the information in the global coordinate system regarding the posture angular velocity of the body parts to which the sensor devices 20 are attached that is outputted from the posture estimation section 312 and using the information in the global coordinate system regarding the movement acceleration of the body parts to which the sensor devices 20 are attached that is outputted from the gravitational acceleration removal section 314. Then, the velocity estimation processing section 315 outputs the computed information.

The above computation may be performed by time integrating the information regarding the movement acceleration. Further, in an example of the present embodiment, the information regarding the movement velocity may be acquired in a manner described below. That is, the velocity estimation processing section 315 uses the information in the global coordinate system regarding the posture angular velocity and movement acceleration of the sensor-device-attached body parts that is acquired at a plurality of time points (i.e., uses the information regarding such temporal changes), in order to acquire posture information in the global coordinate system regarding the body parts on the basis of the information regarding the corresponding posture angular velocity. Next, the velocity estimation processing section 315 uses the acquired posture information and the information regarding the movement acceleration as input, and sequentially acquires the information regarding the positions of the body parts to which the sensor devices 20 are attached, by using a movement velocity estimation neural network that has machine-learned the relation between the input and the information regarding the positions of the body parts to which the sensor devices 20 are attached (the neural network corresponding to the result of movement velocity estimation machine learning).

Subsequently, the velocity estimation processing section 315 acquires the information regarding the movement velocity of the body parts to which the sensor devices 20 are attached, by time differentiating (performing time subtraction on) the information regarding the positions of the body parts to which the sensor devices 20 are attached that is sequentially acquired in the above instance.

The above-mentioned movement velocity estimation neural network can be implemented by a multi-layer network including, for example, an input layer, a long short-term memory (LSTM) block, and an output layer. In the present example, the input layer includes two fully connected layers, and the output layer includes three fully connected layers. Here, it is assumed that a nonlinear function, such as Rectified Linear Unit (ReLU), is used as an activation function used for output of layers except the input layer and the final layer of the output layer, and that a linear function is used to obtain output of only the final layer of the output layer.

Further, when the movement velocity estimation neural network is to be machine-learned, the output of the sensor devices 20 attached to the body parts is acquired at a plurality of predetermined time points while the positions of the body parts are separately measured and thus known. Then, the acquired output is processed by the angular velocity calibration section 311, the posture estimation section 312, and the gravitational acceleration removal section 314 to acquire posture information based on the posture angular velocity of the body parts to which the sensor devices 20 are attached in a plurality of sets of global coordinate systems (at each time point and of each body part) and thereby acquire the posture information and the information regarding the movement acceleration. Subsequently, the acquired posture information and movement acceleration are used as input to acquire the output of a movement velocity estimation neural network to be machine-learned. Then, the movement velocity estimation neural network is machine-learned by performing a back propagation process based on the difference between the acquired output and the known positions.

Note that, here, it is assumed that the movement velocity estimation neural network (the result of movement velocity estimation machine learning) has machine-learned the relation between the positions of the sensor devices 20 and the movement acceleration and posture information regarding the body parts to which the sensor devices 20 are attached. However, the present embodiment is not limited to the use of such a neural network. For example, an alternative is to use a neural network that has machine-learned the relation between the movement velocity of the body parts to which the sensor devices 20 are attached and the movement acceleration and posture information regarding the body parts to which the sensor devices 20 are attached.

Subsequently, for each of the sensor devices 20, the information regarding the posture angular velocity and the movement acceleration obtained here at each time point is used as input to the movement velocity estimation neural network. Further, the weight between the layers of the movement velocity estimation neural network is repeatedly corrected by performing back propagation through the use of the difference between the output of the movement velocity estimation neural network and the corresponding known movement velocity and movement acceleration of the body parts to which the sensor devices 20 are attached. Alternatively, machine learning may be performed by using what is generally called a distillation method. The distillation method makes use of another movement velocity estimation neural network that has already completed machine learning.

In the above-described manner, the inertial velocity estimation section 31 receives, at the predetermined timing intervals, the information regarding the movement acceleration and posture angular velocity that is outputted from the sensor devices 20, and acquires the information regarding the movement velocity and movement acceleration of the body parts to which the sensor devices 20 are attached that is estimated on the basis of the information regarding the movement acceleration and posture angular velocity. Further, in an example of the present embodiment, the inertial velocity estimation section 31 may output the information regarding the posture angular velocity and posture in a global coordinate system that is obtained by the above computations, in addition to the information regarding the movement velocity and movement acceleration in the global coordinate system of the body parts to which the sensor devices 20 are attached.

In the following example, the inertial velocity estimation section 31 estimates the information regarding the movement velocity and posture angular velocity in the global coordinate system of the body parts to which the sensor devices 20 are attached, and acquires the posture information regarding the body parts corresponding to the current time point by integrating the information regarding the posture angular velocity (multiplying the information regarding the posture angular velocity by time $\Delta t$ and adding the resulting value to the posture information regarding the corresponding body parts that has been acquired at the previous time point).

Further, the inertial velocity estimation section 31 acquires the information regarding the positions of the body parts at the current time point by integrating the information regarding the movement velocity of the body parts (multiplying the movement velocity by time $\Delta t$ and adding the resulting value to the information regarding the corresponding body parts that has been acquired at the previous time point).

The inverse kinematics model computation section 32, as regards body parts correlated to each other in the information regarding position and posture, such as a hand and a wrist, obtains the posture information regarding either one of them (e.g., wrist) from the information regarding the position and orientation of the other (e.g., hand). More specifically, the inverse kinematics model computation section 32 repetitively receives input of information regarding the position and posture of a predetermined human body part at predetermined timing intervals (e.g., at intervals of time $\Delta t$ at which the inertial velocity estimation section 31 receives, for example, the inertial information from the sensor devices 20). Then, the inverse kinematics model computation section 32 estimates the information regarding the position and posture of another predetermined human body part at each time point, and sequentially outputs the result of estimation.

A method for the above-described estimation can be implemented by using various, widely known technologies, including an inverse kinematics model computation method, which uses, for example, an inverse kinematics solver such as a Forward and Backward Reaching Inverse Kinematics (FABRIK) solver, a method based on deep learning, and a method described in Katsu Yamane, et al., "Pin-and-Drag Synergetic Interface for Choreography of Human Figures," Journal of the Robotics Society of Japan, Vol. 20, No. 3, p. 113 (April 2002).

In a certain example of the present embodiment, the inverse kinematics model computation section 32 estimates the position of a wrist on the basis of the posture information regarding a hand and the information regarding the position of the hand that are outputted from the inertial velocity estimation section 31. Further, the inverse kinematics model computation section 32 estimates the posture information regarding the wrist on the basis of the estimated position of the wrist and with the posture information regarding the hand.

A specific process for achieving the above purpose can be performed by using a method described in PCT/JP2018/036973 and PCT/JP2018/033069, which have previously been filed by the applicant of the present invention.

Further, in the present embodiment, the inverse kinematics model computation section 32 stores a plurality of most recent results of estimation of the position of a wrist, acquires the information regarding a plurality of most recent movement velocities of the wrist from the difference between the stored estimation results, and then acquires the information regarding the movement acceleration of the wrist from the difference in the information regarding the movement velocities. Then, the inverse kinematics model computation section 32 outputs the acquired pieces of information.

The body parts position velocity estimation section 33 receives input of, for example, the information regarding the position and movement velocity of some predetermined body parts of a human body model, posture information, and movement acceleration, and estimates and obtains the information regarding the positions and velocities of other body parts different from the above-mentioned body parts of the human body model.

Figure 5:
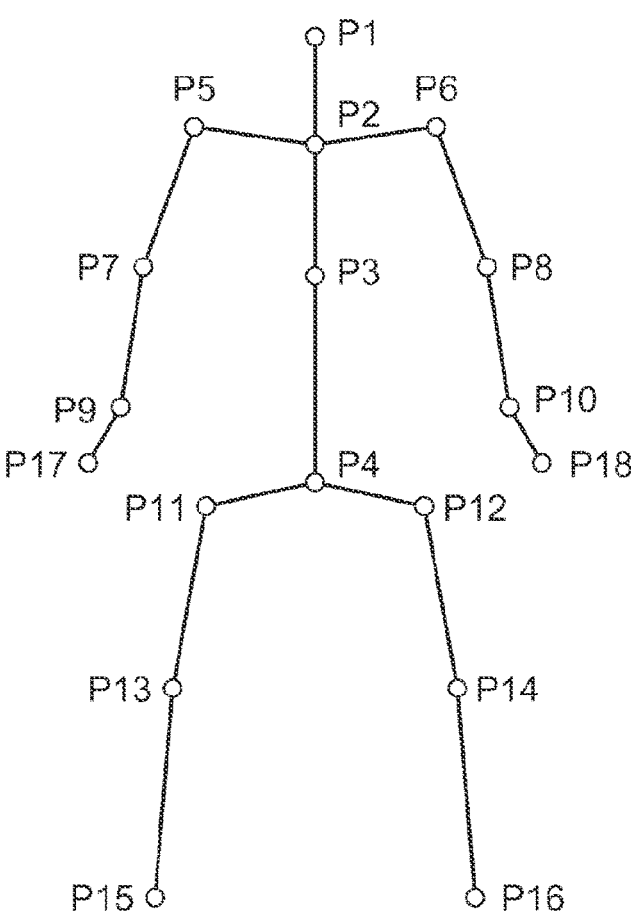
FIG. 5 is an explanatory diagram illustrating an example of a human body model used by the information processing apparatus according to the embodiment of the present invention.

In an example of the present embodiment, the human body model used here includes, as illustrated in FIG. 5, a head node P1, a neck node P2, a chest node P3, a waist node P4, shoulder nodes P5 and P6, elbow nodes P7 and P8, and wrist nodes P9 and P10. The shoulder nodes P5 and P6 are positioned at the ends of left and right branches of the neck node P2. The elbow nodes P7 and P8 are coupled to the shoulder nodes P5 and P6. The wrist nodes P9 and P10 are coupled to the elbow nodes P7 and P8. Further, the human body model includes hip joint nodes P11 and P12, knee nodes P13 and P14, and ankle nodes P15 and P16. The hip joint nodes P11 and P12 are coupled to the ends of left and right branches of the waist node P4. The knee nodes P13 and P14 are coupled to the ends of the hip joint nodes P11 and P12. The ankle nodes P15 and P16 are coupled to the ends of the knee nodes P13 and P14 and regarded as the end nodes of the human body model. Furthermore, in the present embodiment, the human body model includes hand nodes P17 and P18. The hand nodes P17 and P18 are coupled to the terminal ends of the wrist nodes P9 and P10. The above-mentioned nodes correspond to the body parts of the human body model.

In a case where a sensor device 20 is attached to a node (a body part corresponding to the node) of the human body model, the body parts position velocity estimation section 33 in the present embodiment sets the information regarding the position and posture of the node by using the information regarding the position and posture that is obtained by the sensor device 20 (this includes a case where the information is estimated on the basis of the inertial information). Further, in a case where the camera C is unable to capture an image of the sensor device 20 attached to the node (in a case where the position of the sensor device 20 cannot be directly detected because, for example, the sensor device 20 is outside the field of view of the camera C), the body parts position velocity estimation section 33 performs setup by using the results of estimation of the information regarding the position and posture of the node that are based on the posture information regarding the node and on the information regarding the movement acceleration of the node (inertial information).

Meanwhile, in a case where the sensor device 20 is not attached to the body part corresponding to the node, the body parts position velocity estimation section 33 estimates the information regarding the position and posture of the node by using the information regarding the position and posture of the sensor device 20 attached to another body part (a neighboring body part) (this includes a case where estimation is made on the basis of the inertial information), and performs setup by using the resulting estimated information.

In the present example, the body parts position velocity estimation section 33 receives input of the information regarding the position and posture (orientation) of the head node P1 of the human body model, input of the information regarding the position and movement acceleration of the left and right hand nodes (the nodes P17 and P18 coupled to the ends of the wrist nodes) (in a case where an image of a sensor device 202 gripped by a hand is captured by the camera C) or the information regarding the posture and movement acceleration of the left and right hand nodes (which is obtained on the basis of the posture angular velocity and movement acceleration outputted from the IMU sensor of the controller device 202 gripped by the hand of the target person and used in a case where the image of the sensor device 202 gripped by the hand cannot be captured by the camera C), and input of the information regarding the position and posture of the left and right ankle nodes P15 and P16 or the information regarding the posture and movement acceleration of the left and right ankle nodes P15 and P16.

Further, when the information regarding the position, posture, and movement acceleration of the left and right wrist nodes P9 and P10 based on the information regarding the position and posture of the left and right hand nodes P17 and P18 is estimated by the inverse kinematics model computation section 32, the body parts position velocity estimation section 33 uses the previous human body model to estimate the position of each node (body part) of the human body model on the basis of the information regarding the position, posture, and movement acceleration of the left and right wrist nodes P9, P10, the information regarding the estimated position and posture of the chest node P3 and waist node P4, the inputted information regarding the position and posture of each body part, and the information regarding the estimated position and posture of each body part. The above estimation may be made by using the result of machine learning regarding the relation between the nodes of the human body model.

The body parts position velocity estimation section 33 initially acquires the information regarding the position and posture of at least the head and left and right hands of the target person (the information regarding the position and posture in the global coordinate system (rotation angle)) directly, for example, from images of the sensor devices 20 attached to the relevant positions (or gripped at the relevant positions) that are captured by the camera C (this section corresponds to position detection means in the present invention). In this initial state, the body parts position velocity estimation section 33 uses the directly acquired information mentioned above to obtain, for example, the information regarding the position and posture of each necessary node, such as the information regarding the position and posture of the chest node P3 of the human body model and the information regarding the positions of the left and right wrist nodes P9 and P10, and sets the information regarding the position, posture, and movement acceleration of the nodes corresponding to body parts determined in advance as the body parts necessary for estimating the posture information regarding the target person based on the human body model (these nodes are hereinafter referred to as the reference body parts) (the specific examples of these nodes are the head node P1, the chest node P3, the wrist nodes P9 and P10, and the ankle nodes P15 and P16). The above-mentioned information regarding the movement acceleration may be the difference in the information regarding position or the information regarding movement acceleration outputted from the sensor devices 20.

Subsequently, as regards nodes corresponding to the above-mentioned reference body parts and having positions and postures that have been directly acquired, for example, from images of the sensor devices 20 captured by the camera C or nodes estimated from the directly acquired information, the body parts position velocity estimation section 33 sets the information regarding the position, posture, and movement acceleration of the nodes by using the acquired or estimated information.

Meanwhile, as regards the nodes corresponding to the above-mentioned reference body parts and having positions and postures that have not been directly acquired, for example, from the images of the sensor devices 20 captured by the camera C, the body parts position velocity estimation section 33 sets the information regarding the position, posture, and movement acceleration of the nodes by using the information regarding estimated values of position and posture outputted from the inertial velocity estimation section 31 and the information regarding movement acceleration.

Further, the body parts position velocity estimation section 33 acquires, for example, the information regarding the posture and movement acceleration of the wrist nodes from the information outputted by the inverse kinematics model computation section 32.

Subsequently, the body parts position velocity estimation section 33 estimates the position and movement velocity of each node of a predetermined human body model on the basis of the set information regarding the position, posture, and movement acceleration of the nodes (the nodes corresponding to the reference body parts).

Stated differently, after acquiring the information regarding, for example, the position, posture, and movement velocity of the wrist nodes P9 and P10, the body parts position velocity estimation section 33 estimates the position and movement velocity of the hand nodes P17 and P18 by using, for example, the inverse kinematics solver.

Then, the body parts position velocity estimation section 33 outputs the results of estimation of the position and movement velocity of each node of the human body model.

The corrected velocity computation section 34 acquires information regarding corrected movement velocity of each body part by using the information regarding the movement velocity in the global coordinate system of the body parts to which the sensor devices 20 are attached that is outputted from the inertial velocity estimation section 31, and using the information regarding the movement velocity of body parts corresponding to the nodes of the human body model that is outputted from the body parts position velocity estimation section 33.

More specifically, in a case where the information regarding the position of the sensor device 20 on the head node P1 is directly acquired, the corrected velocity computation section 34 acquires the information regarding the movement velocity of the head in the global coordinate system on the basis of the output from the sensor device 20 attached to the head.

Further, in a case where the information regarding the positions of the hand nodes P17 and P18 corresponding to the sensor devices 20 attached to the left and right hands is not directly acquired, the corrected velocity computation section 34 acquires the information regarding the movement velocity in the global coordinate system by using output from the inertial velocity estimation section 31 and output from the body parts position velocity estimation section 33 that are based on the inertial information outputted from the above-mentioned sensor devices 20.

As regards body parts to which the sensor devices 20 are attached and whose positions corresponding to the positions of the attached sensor devices 20 have not been directly acquired, the corrected velocity computation section 34 uses a Kalman filter to combine the movement velocity of the body parts that is outputted from the inertial velocity estimation section 31 and the corresponding movement velocity of the body parts that is outputted from the body parts position velocity estimation section 33, and outputs the result of combination as corrected velocity.

Further, in the case of a wrist, which is one of the body parts, the corrected velocity computation section 34 uses the Kalman filter to combine the information regarding movement velocity of the wrist that is estimated by the inverse kinematics model computation section 32 and the corresponding information regarding the movement velocity of the wrist that is outputted from the body parts position velocity estimation section 33, and outputs the result of combination as the corrected velocity.

Moreover, when performing a process of combining the above pieces of information by using the Kalman filter, the corrected velocity computation section 34 may determine the weight to be applied to the process of combining the information regarding movement velocity outputted from, for example, the inertial velocity estimation section 31 or the inverse kinematics model computation section 32 and the information regarding movement velocity obtained from the human body model by the body parts position velocity estimation section 33, on the basis of the difference between the current time (the time elapsed since position information has become unavailable for acquisition by a direct method) and the last time when, for example, the information regarding the position of each of the relevant nodes has been directly acquired from, for example, images of the sensor devices 20 captured by the camera C or the information regarding the position of each of the relevant nodes has been estimated from the directly acquired information (i.e., acquired by the direct method).

More specifically, for each of the sensor devices 20, the control section 11 in the present embodiment acquires information regarding time indicating a time point at which, for example, the information regarding the position of each of the sensor devices 20 has been directly acquired from, for example, an image captured by the camera C. The information regarding the time may be acquired by using a widely known method, such as a method of acquiring the information from a network time protocol (NTP) server through a clock integrated circuit (IC) or a network.

Subsequently, for each node, the corrected velocity computation section 34 records the last time when the relevant information has been last acquired by the direct method. More specifically, when, for example, the information regarding the position of a node is acquired by the direct method, for example, from an image of a sensor device 20 captured by the camera C, the corrected velocity computation section 34 records, as the last time of the node, the last time when the information regarding the position of the sensor device 20 has been directly acquired by the information captured by the camera C through the use of the direct method (the earliest time if there are a plurality of values of the last time).

The corrected velocity computation section 34 references the last time that has been recorded for each of the relevant nodes, determines the difference between the last time and the current time (the time indicating the time point of processing), and changes, on the basis of the determined difference, the weight that is to be applied to the process of combining through the use of the Kalman filter for estimating the velocity of each of the relevant nodes. More specifically, in a case where the above-mentioned time difference is relatively small, the corrected velocity computation section 34 increases the weight to be applied to the movement velocity of each of the relevant nodes that is outputted from the inertial velocity estimation section 31 or the inverse kinematics model computation section 32, and decreases the weight to be applied to the movement velocity of each of the relevant nodes that is computed by the body parts position velocity estimation section 33.

Meanwhile, in a case where the above-mentioned time difference is relatively great, the corrected velocity computation section 34 decreases the weight to be applied to the movement velocity of each of the relevant nodes that is outputted from the inertial velocity estimation section 31 or the inverse kinematics model computation section 32, and increases the weight to be applied to the movement velocity of each of the relevant nodes that is computed by the body parts position velocity estimation section 33.

Further, the foregoing describes an example where the weight is controlled on the basis of the time difference. However, an alternative is to perform computation to estimate the amount of movement, the acceleration derived from, for example, the inertial information outputted from the IMU sensor, and the magnitude of velocity that are to be seen on or after the time point where information has last been acquired by the direct method, store the results of computation, and take the stored computation results into consideration in addition to the time difference. For example, if the amount of movement, the movement velocity, and the movement acceleration (its maximum value) are small between the last time and the current time in the case where the above-mentioned time difference is relatively great, the corrected velocity computation section 34 may determine that the relevant nodes are still, increase the weight to be applied to the movement velocity of each of the relevant nodes that is outputted from the inertial velocity estimation section 31 or the inverse kinematics model computation section 32, and decrease the weight to be applied to the movement velocity of each of the relevant nodes that is computed by the body parts position velocity estimation section 33.

The corrected position computation section 35 determines the corrected positions of the reference body parts by using the Kalman filter to combine the information regarding the positions of the reference body parts that is outputted from the inertial velocity estimation section 31 (body parts other than the wrists) or the inverse kinematics model computation section 32 (wrist body parts) and the information regarding the positions of the corresponding reference body part nodes that is obtained by the body parts position velocity estimation section 33. The corrected position computation section 35 then outputs the determined corrected positions of the reference body parts.

Further, when performing a process of combining with respect to the above-mentioned positions by using the Kalman filter, the corrected position computation section 35 may, as is the case with the corrected velocity computation section 34, determine, for each node, the weight to be applied to the process of combining the information regarding the positions of the reference body parts that is outputted from the inertial velocity estimation section 31 or the inverse kinematics model computation section 32 and the information regarding the positions that is obtained by the body parts position velocity estimation section 33, on the basis of the difference between the current time (the time elapsed since the position information has become undetectable by a direct method) and the last time when, for example, the information regarding the position of each of the relevant nodes has been acquired by the direct method.

More specifically, in a case where the above-mentioned time difference is relatively small, the corrected position computation section 35 increases the weight to be applied to the information regarding the position of each of the relevant nodes that is outputted from the inertial velocity estimation section 31 or the inverse kinematics model computation section 32, and decreases the weight to be applied to the information regarding the position of the human body model that is computed by the body parts position velocity estimation section 33.

Meanwhile, in a case where the above-mentioned time difference is relatively great, the corrected position computation section 35 decreases the weight to be applied to the information regarding the position of each of the relevant nodes that is outputted from the inertial velocity estimation section 31 or the inverse kinematics model computation section 32, and increases the weight to be applied to the information regarding the position of the human body model that is computed by the body parts position velocity estimation section 33.

Further, also in the present example, an alternative is to perform computation to estimate the amount of movement, the acceleration derived from, for example, the information outputted from the IMU sensor, and the magnitude of velocity that are to be seen on or after the time point where information has last been acquired by the direct method, store the results of computation, and take the stored computation results into consideration in addition to the time difference. For example, if the amount of movement and the movement acceleration (its maximum value) are small between the last time and the current time in the case where the above-mentioned time difference is relatively great, the corrected position computation section 35 may determine that the relevant nodes are still. Thus, the corrected position computation section 35 may increase the weight to be applied to the information regarding the position of each of the relevant nodes that is outputted from the inertial velocity estimation section 31 or the inverse kinematics model computation section 32, and decrease the weight to be applied to the information regarding the position of the human body model that is computed by the body parts position velocity estimation section 33.

An advantage provided by the above example of the present embodiment is described below. For example, the movement of a hand has a high degree of freedom. Thus, the correlation between the posture and position of the hand is low. This makes it difficult to estimate a position on the basis of information regarding posture and acceleration that is outputted from a sensor (particularly, an IMU sensor)

included in a hand-held device such as the controller device 202. However, it is known that there is a correlation between the posture and position of a hand (because the position of the hand varies with its position). Accordingly, as indicated by the above example of the present embodiment, it is possible to determine the posture of a wrist from information regarding the posture and acceleration of a hand by using the inverse kinematics solver, estimate the position of the wrist on the basis of the posture and acceleration of the wrist (e.g., by using a machine learning method), and further estimate the position and posture of the hand (the terminal end of the hand) on the basis of the information regarding the estimated position of the wrist by using the inverse kinematics solver. That is, the position and posture of the hand can be estimated by using information regarding human body movement constraints. Consequently, the result of such estimation can be used to improve the accuracy of position estimation based on information acquired, for example, by the IMU sensor.

The above advantage description is not limited to the case of hands and wrists. In a case where nodes correlated in posture and position are adjacent to uncorrelated nodes that are not correlated to each other in posture and position, that is, in a case where there is a bone model that makes it possible to estimate the postures of correlated nodes inverse or forward kinematically from information regarding the positions of uncorrelated nodes, the posture and acceleration of each correlated node may be determined from the posture and acceleration of each uncorrelated nodes by using a kinematics solver, in order to estimate the positions of the correlated nodes from the posture and acceleration of each of the correlated nodes (e.g., by using the machine learning method) and further estimate the positions of the uncorrelated nodes on the basis of information regarding the estimated positions of the correlated nodes by using the kinematics solver. That is, the positions and postures of the uncorrelated nodes can be estimated by using the information regarding movement constraints. Consequently, the result of this estimation can be used to improve the accuracy of position estimation based on the information regarding the uncorrelated nodes that is acquired, for example, by the IMU sensor.

The output section 36 outputs, to the body parts position velocity estimation section 33, the corrected positions of the reference body parts that are outputted from the corrected position computation section 35. Further, the output section 36 temporarily retains the value of such output in the inertial velocity estimation section 31.

Moreover, the output section 36 outputs the corrected velocities of the body parts that are outputted from the corrected velocity computation section 34 and the corrected positions of the body parts that are outputted from the corrected position computation section 35, and subjects the outputted corrected velocities and positions to various processes (e.g., a process of estimating the posture of the target person (estimating the pose the target person is in)).

Further, the output section 36 may use the corrected velocity of a wrist to separately perform computation to determine the corrected velocity of a hand, which is one of the corrected body part velocities outputted from the corrected velocity computation section 34. In this example, the output section 36 may, for example, assume that the corrected velocity of the wrist and the corrected velocity of the hand can be obtained by adding the relative velocity of the hand with respect to the wrist to the velocity of the wrist, and determine the movement velocity of the hand by adding the movement velocity of the hand that is outputted from the inertial velocity estimation section 31, to the corrected velocity of the wrist, and subtracting the movement velocity of the wrist that is outputted from the inverse kinematics model computation section 32, from the corrected velocity of the wrist.

As an alternative, the output section 36 may receive input of the corrected velocity of a wrist that is outputted from the corrected velocity computation section 34 and input of the movement velocity of a hand that is outputted from the inertial velocity estimation section 31 (and additionally use the movement velocity of the wrist that is outputted from the inverse kinematics model computation section 32), and determine the movement velocity of the hand with respect to the above input by using the result of machine learning (e.g., through a neural network) conducted on the basis of the result of advance measurement.

As another alternative, the output section 36 may use the corrected position of a wrist to separately perform computation to determine the corrected position of a hand, which is one of the corrected body part positions outputted from the corrected position computation section 35. For example, the output section 36 may assume that the corrected position of the wrist and the corrected position of the hand can be obtained as the positions relatively moved by a predetermined distance in a direction indicated by the posture information regarding the hand with respect to the wrist, and determine the position of the hand by multiplying a direction vector in the global coordinate system indicated by the posture information regarding the hand that is outputted from the inertial velocity estimation section 31, by a predetermined value (this value should be determined in advance as the average size of a human hand), and adding the result of multiplication to the corrected position of the wrist.

As still another alternative, the output section 36 may receive input of the corrected position of a wrist that is outputted from the corrected position computation section 35 and input of the posture information regarding a hand that is outputted from the inertial velocity estimation section 31, and determine the position of the hand with respect to the above input by using the result of machine learning (e.g., through a neural network) conducted on the basis of the result of advance measurement.

As described above, in a case where the output section 36 determines the corrected velocity and position of a hand by using the corrected velocity and corrected velocity of a wrist, the human body model used by the body parts position velocity estimation section 33 need not always include the hand nodes. That is, the body parts position velocity estimation section 33 does not necessarily need to estimate the movement velocity and position of the hand nodes.

[Operations] The present embodiment has the above-described configuration and operates in a manner described below. In an example of the present embodiment, the target person is, for example, a player of the game application. The player wears the head-mounted display HMD, which is attached to the head of the player and used as the head sensor device 201, and grips the controller devices 202 by the hands of the player. Further, the foot sensor devices 203 are attached to the left and right ankles of the player.

Further, the player installs the camera C, and initially takes a predetermined pose (e.g., a T pose), by assuming that an image of the whole body (or at least the upper half body) of the player is to be captured by the camera C. When the player activates the information processing apparatus 1 according to the embodiment of the present invention, allows the postures of the body parts of the player to be detected, and starts executing the game application to be used by the player, the control section 11 of the information processing apparatus 1 is initially able to estimate and determine information regarding the positions and postures (orientations) in the global coordinate system of the head, left and right hands, and left and right ankles of the player on the basis of images of the sensor devices 20 that are captured by the camera C.

Then, from the information regarding the positions and postures of the above-mentioned body parts, the control section 11 sets the positions and postures of nodes corresponding to the body parts of the human body model corresponding to the player, namely, the nodes corresponding to the neck, chest, waist, shoulders, elbows, wrists, hip joints, knees, and ankles of the human body model (in a case where the sensor devices 20 are not attached to the corresponding body parts, estimates and determines the positions and postures of the nodes from the positions and postures of the body parts set according to the information acquired by the sensor devices 20).

Further, while the player stays still, the control section 11 acquires, a number of times, information regarding the posture angular velocity that is outputted from the sensor devices 20, determines the angular velocity bias of each of the sensor devices 20 by averaging the acquired pieces of information regarding posture angular velocity obtained for each of the sensor devices 20, and stores the determined angular velocity bias of each of the sensor devices 20 in, for example, the storage section 12.

After determining the angular velocity bias, the control section 11 proceeds to perform the game application process. Following this, the player is supposed to play a game included in the game application.

Subsequently, at predetermined timing intervals (e.g., at intervals of time $\Delta t$), the control section 11 acquires images captured by the camera C, and estimates and determines, on the basis of the acquired images of the sensor devices 20, the positions and postures (orientations) in the global coordinate system of the body parts of the player to which the sensor devices 20 are attached.

Further, the control section 11 acquires inertial information (information regarding movement acceleration and posture angular velocity in a sensor coordinate system) from the sensor devices 20, and performs processes described below.

Specifically, the control section 11 sequentially selects the sensor devices 20 (or may perform parallel processing), and acquires information regarding calibrated posture angular velocity by subtracting values stored in the storage section 12 as the corresponding angular velocity bias values (subtracting each of the corresponding components because the posture angular velocity is a vector value) from the information regarding posture angular velocity that is inputted from the selected sensor devices 20 (referred to as the sensors of interest for explanation purposes). It should be noted that the control section 11 estimates the posture information (acquired at the previous time point) about the body parts to which the sensors of interest are attached and the direction of gravity at the positions of the body parts (Madgwick filter processing) and then uses the result of estimation to convert the information regarding posture angular velocity outputted from the sensors of interest (expressed in a coordinate system specific to the sensors of interest) to the information in the global coordinate system.

Subsequently, as illustrated in FIG. 6, the control section 11 adds the above information regarding calibrated posture angular velocity (a) (which is also converted to the equivalent in the global coordinate system) to the posture information regarding the corresponding body parts that has been obtained at the previous time point, and integrates the result of addition (step S11) to obtain the posture information (expressed as the posture quaternion).

Further, the control section 11 adds the information regarding movement acceleration that is outputted from the sensors of interest (this information should be converted to a value in the global coordinate system), to the information regarding movement velocity of the corresponding body parts that has been acquired at the previous time point, and integrates the result of addition (step S12) to obtain information regarding provisional movement velocity (Vp). Further, the control section 11 adds the information regarding the provisional movement velocity to the information regarding the positions of the corresponding body parts that has been acquired at the previous time point, and integrates the result of addition (step S13) to obtain information regarding provisional position (Pp).

However, the control section 11 may receive input of information regarding posture angular velocity and movement acceleration in the global coordinate system of the body parts to which the sensors of interest are attached that has been obtained by previous processing performed a number of times (at time intervals of time Δt), and acquire the information regarding the movement velocity of each of the body parts to which the sensors of interest are attached, by using the movement velocity estimation neural network that has machine-learned the relation between the movement acceleration to be outputted from each of the sensor devices 20 and the movement velocity of each of the body parts to which the sensor devices 20 are attached. Note that the movement velocity estimation neural network common to all the sensor devices 20 (also common in the weight between the layers of the movement velocity estimation neural network) may be used in the above case.

By performing the above processing on each of the sensor devices 20, the control section 11 acquires the information regarding the position, movement velocity, movement acceleration, and posture in the global coordinate system of each of the body parts to which the sensor devices 20 are attached.

The control section 11 estimates the position of a wrist by using the information regarding the position and posture of a hand, which is one of the above-mentioned body parts (step S14). This estimation process has already been described and will not be redundantly described. Next, the control section 11 determines the velocity of the wrist by using the information regarding the position of the wrist that has been estimated at the previous time point (by using the difference in the position) (step S15). Next, the control section 11 determines the movement acceleration of the wrist by using the information regarding the velocity of the wrist that has been estimated at multiple previous time points (by using the difference in velocity) (step S16).

From the information regarding the position of the wrist that is obtained as described above and the provisional posture information regarding the hand, the control section 11 estimates the posture information regarding the wrist (step S17). This estimation process has also already been described.

By using a predetermined human body model corresponding to the player, the control section 11 presets the information regarding the positions of the reference body part nodes (which are also assumed here to be the head node P1, the chest node P3, the wrist nodes P9 and P10, and the ankle nodes P15 and P16) that are determined in advance as the body parts necessary for kinematically estimating the posture of the target person (the provisional positions or the positions estimated in step S14 or the positions successfully obtained by a direct method), the posture information (the provisional posture information or the posture information estimated in step S17), and the information regarding movement acceleration (the information regarding the provisional movement acceleration or the movement acceleration information obtained in step S16).

Next, the control section 11 estimates the positions and movement velocities of the nodes corresponding to the body parts of the above-mentioned human body model by using the result of machine learning (e.g., a neural network) that is conducted beforehand with respect to the relation between the information regarding the position, posture, and movement acceleration of each of the above reference body part nodes and the position and movement velocity of each of the nodes (step S18).

In the above-described manner, the control section 11 updates, at the above predetermined timing intervals (at time intervals of time Δt), the information regarding the position and movement velocity of each of the nodes of the human body model (hereinafter referred to as the model position and as the model movement velocity).

For the model position of each of the body parts, the control section 11 uses the Kalman filter to combine the positions of the corresponding nodes (except the wrist nodes) that are obtained in step S13 and the positions of the wrists that are obtained in step S14, and regards the result of combination as the corrected positions of the nodes (step S19). Further, the control section 11 determines the positions of the left and right hands by using the corrected positions of the left and right wrists that are among the above-mentioned corrected positions of the nodes and the posture information regarding the left and right hands that is obtained in step S11 (step S20). Subsequently, the control section 11 outputs the corrected positions of the nodes (except the positions of the hands) and the positions of the hands that are determined in step S20 (position output).

Further, for the model movement velocity of each node, the control section 11 uses the Kalman filter to combine the movement velocities of the corresponding nodes (except the wrist nodes) that are obtained in step S12 and the movement velocities of the wrists that are obtained in step S15, and regards the result of combination as the corrected velocities of the nodes (step S21). Moreover, the control section 11 determines the movement velocities of the left and right hands by using the corrected velocities of the left and right wrists that are among the above-mentioned corrected velocities, the corrected velocities of the left and right hands that are obtained in step S12, and the movement velocities of the wrists that are obtained in step S15 (step S22). Subsequently, the control section 11 outputs the corrected velocities of the nodes (except the hand nodes) and the movement velocities of the hands that are obtained in step S22 (velocity output).

The control section 11 presets the information regarding the positions and postures of the reference body part nodes of the human body model corresponding to the player (assumed here to be also the head node P1, the chest node P3, the wrist nodes P9 and P10, and the ankle nodes P15 and P16) that are determined in advance as the body parts necessary for estimating the posture of the target person according to inverse kinematics.

Stated differently, as regards the above-mentioned reference body part nodes whose positions and postures have been directly acquired from, for example, images of the sensor devices 20 captured by the camera C or the above-mentioned reference body part nodes whose positions and postures have been estimated from the directly acquired information, the control section 11 sets the information regarding positions and postures of such nodes according to the acquired or estimated information.

Further, as regards the above-mentioned reference body part nodes whose information regarding the positions and postures has not been directly acquired, for example, from images of the sensor devices 20 captured by the camera C, the control section 11 sets the information regarding the positions and postures of such nodes according to the corrected positions and posture information regarding the reference body part nodes that have been obtained by the previous processing, and then uses the set information regarding the positions and postures for the processing performed at the next time point.

Further, the control section 11 outputs the information regarding the above estimated positions and movement velocities of the body parts (the information may additionally include the posture information) to the game application, and allows the outputted information to be processed by the game application.

As the present embodiment is configured as described above, it is able to track the body parts of the player by using the output (inertial information) from the IMU sensor included in each of the sensor devices 20 even in a case where a sensor device 20 attached to an ankle of the player walking around is outside the field of view of the camera C or a sensor device gripped by a moving hand of the player is outside the field of view of the camera C.

Further, the present embodiment corrects the inertial information that is outputted from each of the sensor devices 20 according to the result of movement velocity estimation machine learning, and thus reduces the influence of, for example, random noise appearing in the output from the IMU sensor.

Note that the foregoing description of the present embodiment assumes that the camera C fixed to a predetermined position is used to detect, for example, the positions of the sensor devices 20. However, the present embodiment is not limited to such a configuration. For example, an alternative is to make position and posture estimation by attaching cameras to some of the sensor devices 20 (instead of attaching LEDs or other markers) and perform what is generally called a Simultaneous Localization and Mapping (SLAM) process in order to process images sequentially captured by the cameras and track the positions of feature points of the images.

Another alternative is to attach no marker to some of the sensor devices 20, for example, to the foot sensor devices 203 attached to the ankles, and estimate, for example, the positions and postures of the ankles on the basis of only the output from the IMU sensor. In this case, for example, a process of determining the positions of the feet may initially be performed by using an inverse kinematic estimation method.

Furthermore, the processing according to the present embodiment is also applicable to a case where the foot sensor devices 203 are not used. In this case, the information processing apparatus 1 estimates, for example, the positions of the body parts ranging from the head to the hands or estimates, for example, the positions of the body parts down to the feet by using the human body model.

REFERENCE SIGNS LIST

1: Information processing apparatus
11: Control section
12: Storage section
13: Operation control section

14: Output control section
20: Sensor device
31: Inertial velocity estimation section
32: Inverse kinematics model computation section
33: Body parts position velocity estimation section
34: Corrected velocity computation section
35: Corrected position computation section
35: Output section
201: Head sensor device
202: Controller device
203: Foot sensor device
311: Angular velocity calibration section
312: Posture estimation section
314: Gravitational acceleration removal section
315: Velocity estimation processing section
2031: Belt
2032: Main body device

The invention claimed is:

1. An information processing apparatus comprising:
   a processor configured to:
      acquire, from a plurality of sensors attached to a plurality of body parts and configured to connect to the information processing apparatus, information regarding movement acceleration and posture angular velocity of a body part of the plurality of body parts;
      estimate, on a basis of the information, a movement velocity in a predetermined coordinate system of the body part of the plurality of body parts;
      estimate, for the body part of the plurality of body parts, a position by fusing position information derived from the estimated movement velocity, and directly acquired position information for the body part, the fusing comprising dynamically weighting a contribution of each source based on elapsed time since a last direct position measurement of the body part; and
      subject information regarding the estimated position of the body part to a predetermined process that estimates a posture of a target person by performing an inverse kinematics model computation.

2. The information processing apparatus according to claim 1, wherein the processor is further configured to:
   estimate a direction of gravity in the predetermined coordinate system, using information regarding the direction of gravity to correct the movement acceleration; and
   estimate, on a basis of the information regarding the movement acceleration, a movement velocity in the predetermined coordinate system of the body part.

3. The information processing apparatus according to claim 1, wherein the processor is further configured to:
   estimate the movement velocity of the body part using information that is related to temporal changes in the movement acceleration and posture angular velocity in the predetermined coordinate system of the body part and is estimated on a basis of the information regarding the movement acceleration and posture angular velocity.

4. The information processing apparatus according to claim 1, wherein the processor is further configured to:
   acquire information regarding the position of the body part and posture of the body parts of the target person that are estimated by the inverse kinematics model computation; and estimate the position of the body part by combining the information regarding the position of the body part and the information regarding the movement velocity of the body part.

5. The information processing apparatus according to claim 1, wherein the processor is further configured to:
estimate the position of the body parts by combining the information regarding the movement acceleration and posture angular velocity and the information regarding the movement velocity of the body part with a weight applied to each piece of the information.

6. The information processing apparatus according to claim 5, wherein the processor is further configured to determine the weight according to a length of time elapsed since the position of the body part has not been acquired.

7. The information processing apparatus according to claim 5, wherein the processor is further configured to determine the weight on a basis of at least one of an amount of movement, movement velocity, and movement acceleration of the body part.

8. The information processing apparatus according to claim 1, wherein
the body part includes a hand of a target person, and
wherein the processor is further configured to estimate a posture of a wrist by performing the inverse kinematics model computation on a predetermined human body model on a basis of information regarding posture angular velocity and movement acceleration of the hand, to estimate a position of the wrist on a basis of the posture of the wrist, and further configured to estimate a position of the hand on a basis of information regarding the position of the wrist.

9. A method comprising:
acquiring, from a plurality of sensors attached to a plurality of body parts, at least information regarding movement acceleration of a body part of the plurality of body parts and posture angular velocity of the body part of the plurality of body parts;
estimating, on a basis of the information a movement velocity in a predetermined coordinate system of the body part of the plurality of body parts;
estimating, for the body part of the plurality of body parts, a position by fusing position information derived from the estimated movement velocity, and directly acquired position information for the body part, the fusing comprising dynamically weighting a contribution of each source based on elapsed time since a last direct position measurement of the body part; and
subjecting the information regarding the position of the body part to a predetermined process that estimates a posture of a target person by inverse kinematics model computation.

10. A non-transitory, computer readable storage medium containing a program for an information processing apparatus, when executed, causing the information processing apparatus to carry out actions, comprising:
acquiring, from a plurality of sensors attached to a plurality of body parts, at least information regarding movement acceleration of a body part of the plurality of body parts and posture angular velocity of the body part of the plurality of body parts;
estimating, on a basis of the information, movement velocity in a predetermined coordinate system of the body part of the plurality of body parts;
estimating, for the body part of the plurality of body parts, a position by fusing position information derived from the estimated movement velocity, and directly acquired position information for the body part, the fusing comprising dynamically weighting a contribution of each source based on elapsed time since a last direct position measurement of the body part; and
subjecting information regarding the estimated position of the body part to a predetermined process that estimates a posture of a target person by performing an inverse kinematics model computation.

11. The method of claim 9, wherein estimating the movement velocity further comprises:
estimating a direction of gravity in the predetermined coordinate system, using information regarding the direction of gravity to correct the movement acceleration; and
estimating, on a basis of the information regarding the movement acceleration, a movement velocity in the predetermined coordinate system of the body part.

12. The method of claim 9, wherein estimating the movement velocity further comprises:
estimating the movement velocity of the body part using information that is related to temporal changes in the movement acceleration and posture angular velocity in the predetermined coordinate system of the body part and is estimated on a basis of the information regarding the movement acceleration and posture angular velocity.

13. The method of claim 9, further comprising:
acquiring information regarding the position of the body part and posture of the body part of the target person that are estimated by the inverse kinematics model computation; and
estimating the position of the body part by combining the information regarding the position of the body part and the information regarding the movement velocity of the body part.

14. The method of claim 9, further comprising:
estimating the position of the body part by combining the information regarding the movement acceleration and posture angular velocity and the information regarding the movement velocity of the body part with a weight applied to each piece of the information.

15. The method of claim 9, further comprising:
estimating a posture of a wrist by performing the inverse kinematics model computation on a predetermined human body model on a basis of information regarding posture angular velocity and movement acceleration of a hand among the plurality of the body parts;
estimating a position of the wrist on a basis of the posture of the wrist; and
estimating a position of the hand on a basis of information regarding the position of the wrist.

16. The non-transitory, computer readable storage medium of claim 10, wherein estimating the movement velocity further comprises:
estimating a direction of gravity in the predetermined coordinate system, using information regarding the direction of gravity to correct the movement acceleration; and
estimating, on a basis of the information regarding the movement acceleration, a movement velocity in the predetermined coordinate system of the body part.

17. The non-transitory, computer readable storage medium of claim 10, wherein estimating the movement velocity further comprises:
estimating the movement velocity of the body part using information that is related to temporal changes in the movement acceleration and posture angular velocity in the predetermined coordinate system of the body part
and is estimated on a basis of the information regarding
the movement acceleration and posture angular veloc-
ity.

18. The non-transitory, computer readable storage
medium of claim 10, wherein the actions further comprise:
   acquiring information regarding the position of the body
      part and posture of the body part of the target person
      that are estimated by the inverse kinematics model
      computation; and
   estimating the position of the body part by combining the
      information regarding the position of the body part and
      the information regarding the movement velocity of the
      body part.

19. The non-transitory, computer readable storage
medium of claim 10, wherein the actions further comprise:
   estimating the position of the body part by combining the
      information regarding the movement acceleration and
      posture angular velocity and the information regarding
      the movement velocity of the body part with a weight
      applied to each piece of the information.

20. The non-transitory, computer readable storage
medium of claim 10, wherein the actions further comprise:
   estimating a posture of a wrist by performing the inverse
      kinematics model computation on a predetermined
      human body model on a basis of information regarding
      posture angular velocity and movement acceleration of
      a hand among the plurality of the body parts;
   estimating a position of the wrist on a basis of the posture
      of the wrist; and
   estimating a position of the hand on a basis of information
      regarding the position of the wrist.

* * * * *